F. E. & A. S. ELMORE.
APPARATUS FOR SEPARATING SOLIDS FROM LIQUIDS.
APPLICATION FILED DEC. 7, 1908.
919,144.  Patented Apr. 20, 1909.
2 SHEETS—SHEET 1.
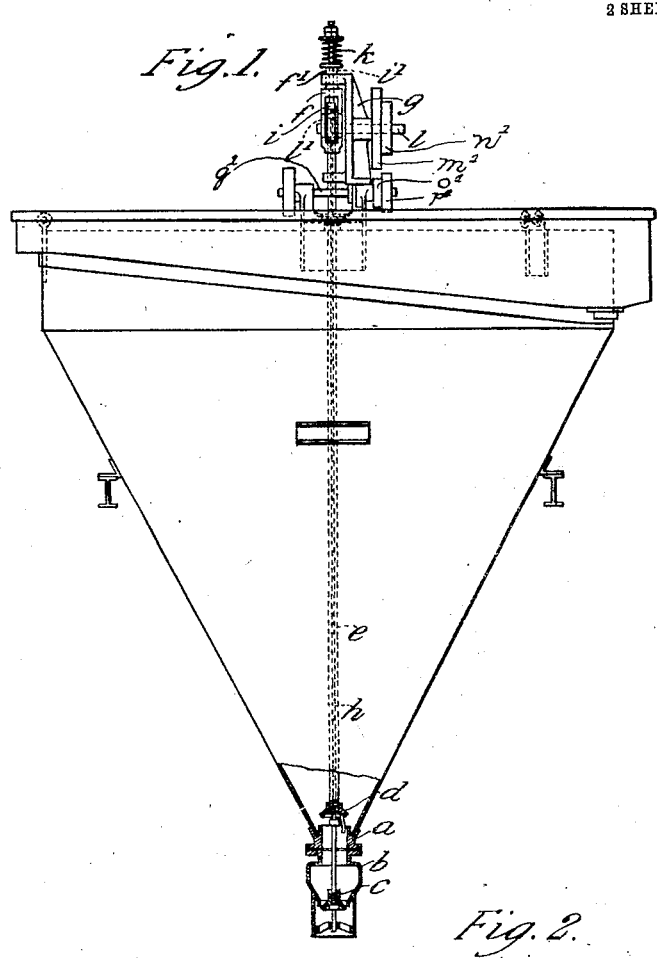
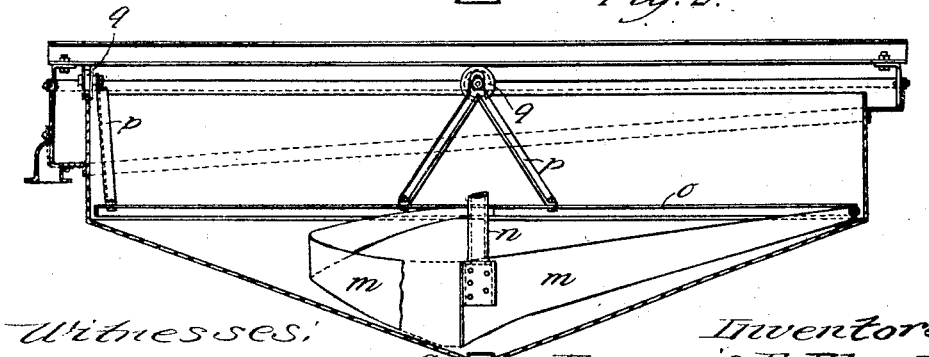

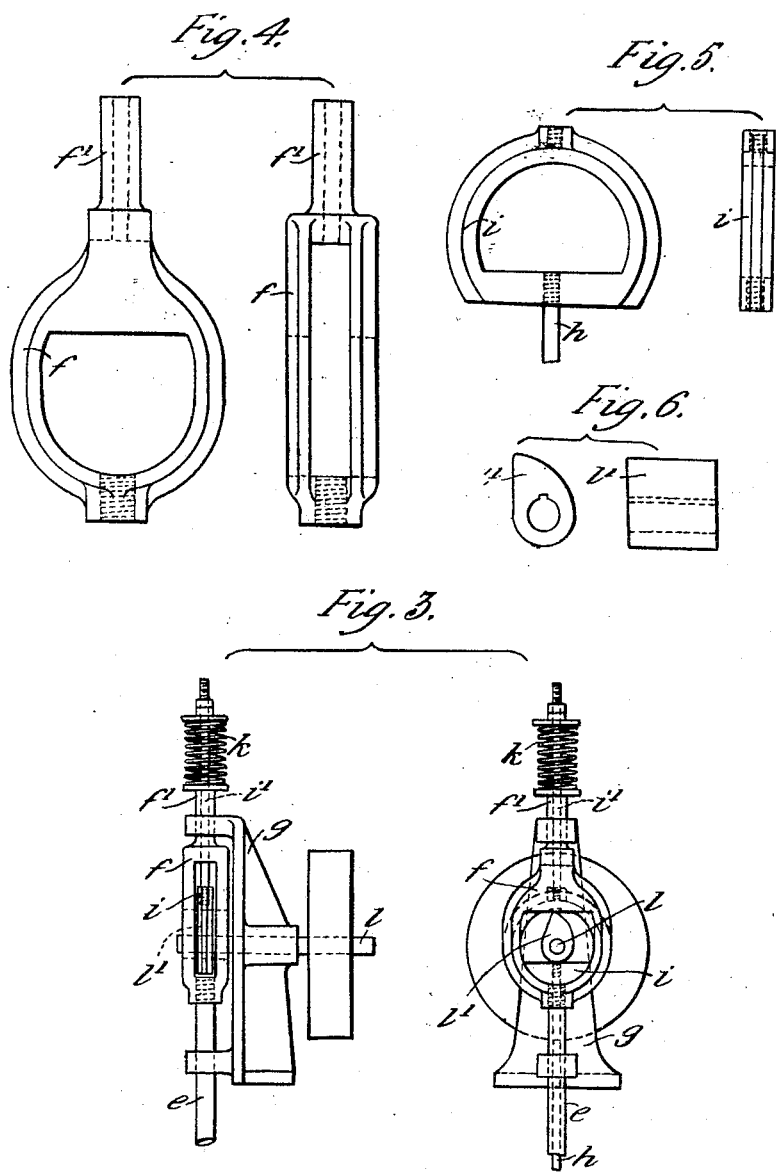

UNITED STATES PATENT OFFICE.

FRANCIS EDWARD ELMORE AND ALEXANDER STANLEY ELMORE, OF LONDON, ENGLAND.

APPARATUS FOR SEPARATING SOLIDS FROM LIQUIDS.

No. 919,144.

Specification of Letters Patent.

Patented April 20, 1909.

Application filed December 7, 1908. Serial No. 466,853.

*To all whom it may concern:*

Be it known that we, FRANCIS EDWARD ELMORE and ALEXANDER STANLEY ELMORE, both subjects of the King of Great Britain, both residing at 4 Broad Street Place, in the city of London, England, electrometallurgists, have jointly invented certain new and useful Improvements in Apparatus for Separating Solids from Liquids, of which the following is a specification.

A well known method of more or less completely separating more or less finely divided solid matter from a liquid consists in running the mixture into a downwardly coned tank, such as is known in mining parlance as a spitzkasten. The solid matter or part of it collects in the lower part of the tank, the more or less clarified liquid overflowing the lip of the tank into a gutter; from time to time a spigot, cock or valve in the lower part of the tank is opened by hand or automatically and the solid matter or a portion thereof allowed to flow out together with a certain quantity of the liquid. In working such apparatus difficulties arise owing to absence of means for accurately adjusting the proportion of liquid escaping with the solid, and to the tendency for the solid matter to pack, so that when the cock, valve or spigot is opened no flow of the material occurs through it.

Our invention relates to improvements in apparatus of this kind in which there are two valves at the bottom of the vessel, the space between them forming a chamber.

According to our invention in order that the opening of the valves may be suitably timed to procure the right proportion of water to solid matter, the valves are mechanically operated by a suitable gear. If the upper valve opens inwardly into the tank its movement will agitate the solid matter sufficiently to counteract the effect of packing.

In the preferred form of the apparatus the tank is open at its point and into the opening is screwed or otherwise fixed a chamber of any suitable form and dimensions. At or near the upper end of this chamber is a seating for a valve which is operated by means of a rod attached to it and extending to the top of the tank. At or near the lower end of the chamber there is a seating for another valve. These valves are opened alternately, preferably by means of levers operated by cams on rotating shafts or a rotating shaft. It is generally advisable that there should be an air vent from the chamber, and this may conveniently be provided by perforating the top valve and screwing into the perforation a pipe which plays the part of the aforesaid rod.

If the pipe to the top valve be made of sufficiently large diameter the bottom valve may be operated by a rod extending through the said pipe.

In some cases it may be found necessary or advisable to make the pointed tank of such diameter in relation to its depth that the angle formed by the sides and bottom becomes too flat to enable the settled solid matter to slide to the point where the valve chamber has been fixed. In such cases we provide the tank with slowly moving arms or rakes of suitable shape gradually to draw or collect the settled solid matter without unduly disturbing it in a manner similar to that in which like rakes or arms have been used in known apparatus, to the point where the valve chamber is situated. In some cases, such, for instance, as the tank being of large dimensions it becomes necessary to support the moving arms at their outer ends. We prefer to do this by attaching the outer ends of the arms or rakes to wheels running on a track placed in such a position as to prevent the solid matters settling upon it. The overflow lip of the tank may conveniently be used for this purpose.

Inasmuch as it may be arranged that at each filling and emptying of the chamber the quantity of solid and liquid discharged is the same, the apparatus may be used for measuring the material. Furthermore, the apparatus serves also for supplying the mixture of solid and liquid uniformly from a tank which itself receives a varying quantity of the mixture.

The accompanying drawings illustrate the invention.

Figure 1 is an elevation partly in section of a comparatively deep tank having the double valve, Fig. 2 is a vertical section through a shallow tank having revolving arms for collecting the solid matter and Figs. 3-6 are detail views drawn to an enlarged scale.

Referring to Figs. 1, 3, 4, 5 and 6 the point of the tank is open and is fitted with a short flanged pipe $a$ to which is fixed the flanged mouth of a chambered receptacle $b$ open at its lower end where there is a seating for a valve $c$. The upper end of the short pipe $a$ forms a seat for a valve $d$, the stem of which is a pipe $e$ extending to the top of the tank where its upper end is fixed to a stirrup $f$ the hollow stem $f'$ of which is guided in a bracket $g$ fixed above the tank.

The stem $h$ of the valve $c$ is a rod extending through the pipe $e$ and fixed at its upper end to a stirrup $i$ situated within the stirrup $f$ and having a stem $i'$ which extends through the hollow stem $f'$. A helical spring $k$ surrounds the upper end of stem $i'$ and bears at its lower end against the flanged end of stem $f'$ and at its upper end against a collar on the stem $i'$.

Extending through stirrups $f$ and $i$ is a shaft $l$ supported by bracket $g$ and suitably driven. On this shaft is keyed a cam $l'$ (Fig. 6) broad enough to extend through stirrup $f$. The stirrups $f$ and $i$ are so shaped that as the cam revolves it alternately lifts stirrup $f$, compressing spring $k$, and depresses stirrup $i$, again compressing spring $k$. In this manner valves $c$ and $d$ are alternately opened by the cam and closed by the spring. The shaft $l$ carries two pulleys $m^1$, $n^1$ of different diameters which can be driven, respectively, by a belt from pulleys $o^1$ and $p^1$ fast to the shaft $q^1$ which may be driven by any suitable motor. This gear permits of the rotation of the cam $l'$ at either of two speeds according to the interval which has to elapse between successive operations of the valves $c$ and $d$.

Referring to Fig. 2, the curved arms $m$ are fixed to a vertical shaft $n$ mounted to turn in suitable bearings and, if necessary, hollow to admit valve-stems extending through it. The outer ends of the blades are bolted to a ring $o$, suspended by hangers $p$ from wheels $q$ adapted to run on the upper edge of the tank.

Having thus described the nature of this invention and the best means we know of carrying the same into practical effect, we claim:—

1. Apparatus for separating subdivided solid matter from a liquid comprising a downwardly coned vessel, a receptacle at the bottom of said vessel arranged to receive solid matter which settles in such vessel and having an inlet opening and a discharge opening, a lift valve at the apex of said coned vessel adapted to close the said inlet opening and operable to open inwardly into the bottom of said vessel, a lift valve adapted to close the said discharge opening, and power driven mechanism for operating the said valves to open them alternately at a rate of speed sufficient to maintain the pulp at the apex of the coned vessel in a state of agitation.

2. Apparatus for separating subdivided solid matter from a liquid comprising a downwardly coned vessel, a chambered receptacle at the bottom of said vessel adapted to receive solid matter which settles in the receptacle and having an inlet opening and a discharge opening, a lift valve at the apex of said coned vessel adapted to close the said inlet opening and mounted to open inwardly into the apex portion of said vessel, a lift valve adapted to close the said discharge opening, power driven mechanism for operating the said valves to open them alternately at a rate adapted to maintain the pulp at the apex of said coned vessel in agitation, and means whereby the interval of time between the successive operations of the said valves may be varied.

3. Apparatus for separating subdivided solid matter from a liquid comprising a downwardly coned vessel, a receptacle at the bottom of the vessel adapted to receive solid matter which settles in the vessel, and provided with an inlet opening and a discharge opening, a lift-valve adapted to close the said inlet opening, a lift-valve adapted to close the said discharge opening, a tubular stem to the first-named valve, a stem to the second-named valve adapted to extend through the first-named stem, a stirrup terminating the first-named stem, a stirrup terminating the second-named stem and adapted to slide within the first-named stirrup, a power driven shaft extending through both stirrups, a cam on the said shaft adapted to engage each stirrup alternately so as to depress the inner stirrup and raise the outer stirrup, a spring adapted to be compressed whenever the cam is operative, and gearing whereby the speed of the power driven shaft may be varied.

4. Apparatus for separating subdivided solid matter from a liquid comprising a downwardly coned vessel, a receptacle at the bottom of the vessel adapted to receive solid matter which settles in the vessel, and having an inlet opening and a discharge opening, a lift-valve adapted to close the said inlet opening, a lift-valve adapted to close the said discharge opening, power driven mechanism for opening the said valves alternately, means whereby the interval of time between the successive operations of the said valves may be varied, arms adapted to travel over the bottom of the vessel so as to move the deposited solid matter toward the said inlet opening, a track on the upper portion of the vessel, out of range of
5 the solid matter, a frame supporting the scraper arms, and wheels mounted upon said frame and operating on the said track.

In testimony whereof we have signed our names to this specification in the presence of two subscribing witnesses.

FRANCIS EDWARD ELMORE.
ALEXANDER STANLEY ELMORE.

Witnesses:
JOSEPH MILLARD,
W. J. SKERTEN.